2,784,218
Patented Mar. 5, 1957

2,784,218
PURIFICATION OF ACRYLONITRILE

David W. McDonald, Texas City, Tex., assignor to Monsanto Chemical Company, St. Louis, Mo., a corporation of Delaware No Drawing. Application December 29, 1954,
Serial No. 478,497

2 Claims. (Cl. 260—465.9)

This invention relates to acrylonitrile and more specifically to a process for its purification.

Acrylonitrile is a well known article of commerce and is widely used in the preparation of various types of synthetic resins and fibers. It is also a valuable intermediate in the preparation of other organic compounds. In most applications, particularly when used in the preparation of synthetic resins or fibers, it is necessary that acrylonitrile of exceptional purity be used. Most of the processes used for the preparation of acrylonitrile simultaneously produce, in addition to acrylonitrile, minor amounts of carbonyl-containing compounds, particularly methyl vinyl ketone. Acrylonitrile containing minor quantities of methyl vinyl ketone is unsatisfactory for many applications.

It is an object of this invention to provide a process for the purification of acrylonitrile.

It is a particular object of this invention to provide a process for the removal of minor amounts of methyl vinyl ketone from acrylonitrile.

Additional objects will become apparent from the description of the process of this invention.

It is known that the methyl vinyl ketone content of acrylonitrile containing minor amounts of methyl vinyl ketone can be substantially reduced by treating the thus contaminated acrylonitrile with a minor amount of a compound selected from the group consisting of the alkali metal, alkaline earth metal, and ammonium bisulfites. Such a process of purification is the subject of a co-pending application, Serial No. 478,496, filed of even date. It has now been discovered that such a process may be significantly improved by carrying out the treatment with a minor amount of an aqueous solution of these compounds buffered to a pH within the range of 6 to 8. By employment of solutions of these bisulfites of the indicated pH range any losses of acrylonitrile which might result from cyanoethylation in the system are materially reduced or even eliminated completely. It is notable too, that in most cases the reduction in methyl vinyl ketone content is also more pronounced when the buffered solutions are employed for the treatment.

The treatment can be carried out in any convenient manner. Preferably, the acrylonitrile containing methyl vinyl ketone is stirred up with a solution of an alkali metal, alkaline earth metal, or ammonium sulfite-sulfuric acid reagent containing a suitable buffer and the corresponding bisulfite is generated "in situ." Alternatively, aqueous solutions of the bisulfites themselves containing the buffers may be used.

The following examples illustrate the process of the invention:

Example I

Approximately 100 grams (125 ml.) of acrylonitrile containing approximately 700 parts by weight of methyl vinyl ketone per million parts of acrylonitrile (p. p. m.) was vigorously agitated at room temperature (25° C.) for a period of five minutes with 50 ml. of an aqueous solution of a sodium sulfite-sulfuric acid reagent to which a commercial phosphate-NaOH buffer had been added to maintain the pH of the mixture during the reaction at 7.85. The sulfite-acid reagent was prepared by combining 5 parts by volume of 1 M sodium sulfite solution with 1 part by volume of 1 N sulfuric acid. The mixture was allowed to settle and the two layers formed were separated by decantation. The acrylonitrile layer was then flash-distilled to recover a product containing only 58 p. p. m. of methyl vinyl ketone.

Example II

The experiment of Example I was repeated and a purified acrylonitrile containing less than 100 p. p. m. of methyl vinyl ketone was obtained.

Example III

The experiment described in Examples I and II was again repeated but on another sample of acrylonitrile containing 530 p. p. m. of methyl vinyl ketone. In this case, 50 ml. of an aqueous solution containing 15 ml. of the sodium sulfite-sulfuric acid reagent described in Example I was used for treating. After a one-minute treatment the methyl vinyl ketone content of the acrylonitrile was reduced to 160 p. p. m.

Example IV

The procedure of Example I was repeated on a sample of acrylonitrile containing 530 p. p. m. of methyl vinyl ketone, but using 50 ml. of an aqueous solution containing only 30 ml. of the sodium sulfite-sulfuric acid reagent and enough of a sodium acetate-acetic acid buffer to give a pH of 6.5. After a one-minute treatment, methyl vinyl ketone content was 140 p. p. m., while treatment for five minutes reduced the methyl vinyl ketone value to 60 p. p. m.

The preceding examples illustrate particular embodiments of the novel process of this invention. Substantial variations in the conditions set forth in these examples are possible without departing from the scope of the invention. For example, many of the alkali metal, alkaline earth metal, or ammonium bisulfites can be used in this process. These include the sodium, potassium, lithium, magnesium, calcium, and ammonium bisulfites. The reaction can be carried out by treatment of the acrylonitrile with either the sulfite-sulfuric acid reagent made by combining 5 parts of the 1-molar sulfite with 1 part of 1 N sulfuric acid or aqueous solutions of the alkali metal, alkaline earth metal or ammonium bisulfites themselves. When an aqueous solution of the bisulfites is used the concentration of the bisulfite in the aqueous solution can be varied substantially as, for example, from 0.05% to 10%, depending upon the solubility of the particular bisulfites used. Even higher concentrations of the bisulfite can be used if desired.

The quantity of the sulfite-sulfuric acid solution or the bisulfite solution employed is also subject to substantial variation. Preferably it is employed in excess up to twenty-fold of that required to react with the methyl vinyl ketone contained in the acrylonitrile.

Any of the commercial buffers employed to regulate pH in the range from 6 to 8 is suitable for use in the invention. Typical among such buffers are sodium acetate-acetic acid, monosodium phosphate-sodium hydroxide, sodium citrate, and potassium acid phthalate-sodium hydroxide.

The treatment of acrylonitrile in accordance with the process of this invention can be carried out over a wide temperature range, varying from 0° C. to approximately 78° C., the boiling point of acrylonitrile. To prevent any substantial loss of acrylonitrile the reaction is preferably carried out at a temperature below about 40° C.

After the reaction is complete, substantially pure acrylonitrile can be recovered in any convenient manner well known to those skilled in the art. Distillation of the acrylonitrile from the reaction mixture affords a simple and economical method of recovery.

What is claimed is:

1. A process for the purification of acrylonitrile containing methyl vinyl ketone which comprises treating said acrylonitrile with a minor amount of an aqueous solution of a sodium sulfite-sulfuric acid mixture containing five parts by volume of 1-molar sodium sulfite and one part by volume of 1 N sulfuric acid buffered to a pH within the range from about 6 to about 8.

2. The process as described in claim 1 wherein the treatment is carried out at a temperature below about 40° C.

References Cited in the file of this patent
UNITED STATES PATENTS

| | | |
|---|---|---|
| 2,242,309 | Lazier et al. | May 20, 1941 |
| 2,494,087 | Daniels | Jan. 10, 1950 |
| 2,678,945 | Taylor | May 18, 1954 |